United States Patent
Shimanuki (12) 
(10) Patent No.: US 6,839,198 B2
(45) Date of Patent: Jan. 4, 2005

(54) PICKER MECHANISM WITH TURNTABLE HAVING HAND AND SLIDER MECHANISMS AND TURN TABLE DRIVING MOTOR PROVIDED THEREON

(75) Inventor: Hiroyuki Shimanuki, Yonezawa (JP)

(73) Assignee: NEC Corporation, Tokyo (JP)

( * ) Notice: Subject to any disclaimer, the term of this patent is extended or adjusted under 35 U.S.C. 154(b) by 158 days.

(21) Appl. No.: 10/295,826

(22) Filed: Nov. 18, 2002

(65) Prior Publication Data

US 2003/0095355 A1 May 22, 2003

(30) Foreign Application Priority Data

Nov. 19, 2001 (JP) ........................................ 2001-353890

(51) Int. Cl.[7] .............................................. G11B 15/68
(52) U.S. Cl. ......................................................... 360/92
(58) Field of Search ................................ 360/92, 98.04, 360/98.06; 369/30.43, 30.44, 30.45, 30.55, 30.56, 30.57

(56) References Cited

U.S. PATENT DOCUMENTS 6,160,678 A * 12/2000 Meikle et al. ................. 360/92

FOREIGN PATENT DOCUMENTS

| JP | 11-167757 A | 6/1999 |
|---|---|---|
| JP | 2000-48451 A | 2/2000 |
| JP | 2003-45102 A | 2/2003 |

* cited by examiner

Primary Examiner—Craig A. Renner
(74) Attorney, Agent, or Firm—Sughrue Mion, PLLC (57) ABSTRACT

A picker mechanism of a magnetic tape library apparatus can restrict space for portions other than a turn table narrow, simplify a mechanism, restrict size in vertical direction and length in back and forth direction, and restrict size of a picker base for permitting down-sizing thereof. The picker mechanism includes a Swivel mechanism having a disc shaped turn table, a turn table driving motor for driving the turn table and a plate form picker base holding the turn table, and a hand mechanism having a finger mechanism for clamping the magnetic tape cartridge and a slider mechanism for moving the magnetic tape cartridge on the turn table. The turn table driving motor is arranged on the turn table and the turn table driving motor and the turn table are integrally rotated on the picker base.

8 Claims, 13 Drawing Sheets

PICKER MECHANISM WITH TURNTABLE HAVING HAND AND SLIDER MECHANISMS AND TURN TABLE DRIVING MOTOR PROVIDED THEREON

BACKGROUND OF THE INVENTION

1. Field of the Invention

The present invention relates generally to a magnetic tape library apparatus. More particularly, the invention relates to a picker mechanism to perform movement of a magnetic tape cartridge.

2. Description of the Related Art

Conventionally, in a magnetic tape library apparatus, various picker mechanisms have been proposed for taking out a magnetic tape cartridge from a magazine storing a plurality of magnetic tape cartridges and transporting the magnetic tape cartridge to a magnetic tape drive reading and writing a magnetic tape housed within the magnetic tape cartridge.

One example of the picker mechanism has been disclosed in Japanese Unexamined Patent Publication No. 11-167757. In the above-identified publication, in order to change direction by pivoting the picker, a motor installed within a shaft located at the lower portion of the picker is used. An internal gear is rotated by an external gear connected to the motor. The picker is mounted on the rotating internal gear to perform changing of direction.

On the other hand, another example has been disclosed in Japanese Unexamined Patent Publication No. 2000-48451. In the above-identified publication, a hand mechanism is driven in back and forth direction by means of a pulley and a belt. On the other hand, in an ejecting operation of the magnetic tape cartridge within the picker by the hand mechanism, a hand is opened when the hand mechanism is moved to at the up-front position of the picker, and operation is ended in the condition where the hand is opened.

However, when the motor installed within the shaft located lower portion of the picker is used in order to perform changing of direction by pivoting the conventional picker, size of the picker in the vertical direction becomes large by installing the motor at the lower portion of a picker body. Therefore, large stroke for vertical movement of the picker within the magnetic tape library apparatus cannot be certainly obtained to restrict storage position of the magnetic tape cartridges to make number of tapes to be stored.

On the other hand, when the pulley and the belt is used for driving the hand mechanism in back and forth direction, it becomes necessary to expand the overall length of the picker for the length corresponding to a diameter of the pulleys located at opposite ends of the belt in order to certainly obtain back and forth stroke of the hand mechanism. On the other hand, at the end of the magnetic tape cartridge ejecting operation of the picker, the hand mechanism is located at the front side of the picker in the condition where the hand is held open, occupying area of the picker becomes large to require certainly provide large space for changing direction of the picker within a casing of the magnetic tale library apparatus. For this reason, down-sizing of the magnetic tape library apparatus becomes difficult.

SUMMARY OF THE INVENTION

The present invention has been worked out in view of the problems in the prior art set forth above. Therefore, it is an object of the present invention to provide a picker mechanism of a magnetic tape library apparatus which can restrict space for portions other than a turn table narrow, simplify a mechanism, restrict size in vertical direction and length in back and forth direction, and restrict size of a picker base for permitting down-sizing thereof.

According to one aspect of the present invention, a picker mechanism of a magnetic tape library apparatus including a magnetic tape drive for reading and writing a magnetic tape housed within a magnetic tape cartridge and a magazine storing a plurality of the magnetic tape cartridges, for loading and unloading the magnetic tape cartridge to and from the magnetic tape drive and the magazine, comprising:

a Swivel mechanism having a disc shaped turn table, a turn table driving motor for driving the turn table and a plate form picker base holding the turn table; and a hand mechanism having a finger mechanism for clamping the magnetic tape cartridge and a slider mechanism for moving the magnetic tape cartridge on the turn table, the turn table driving motor being arranged on the turn table and the turn table driving motor and the turn table are integrally rotated on the picker base.

With the present invention, the turn table driving motor and the turn table are integrally rotated on the picker base.

In the preferred construction, the turn table driving motor is arranged on the upper surface of the turn table and outside of the hand mechanism and the magnetic tape cartridge.

A center of rotation of the turn table may be located at the position of a center of the picker base.

The picker base may be square and a diameter of the turn table and one edge of the picker base is substantially equal to each other.

The slider mechanism may include a rack provided long a center line dividing the turn table into left and right half-circular halves, a pinion engaging with the rack, a driving motor for driving the pinion and a plate form slider, on which the driving motor is secured, the slider may be moved along the rack via the pinion, and the finger mechanism provided on the slider may be moved in back and forth direction on the turn table.

Preferably, the finger mechanism includes a finger being a bar member arranged horizontally, having an inner boss provided depending in the vicinity of one end portion of the finger and an outer boss provided in parallel to the inner boss, a finger switch formed from a substantially triangular plate member and pivotably supported on the outer boss at one bottom corners, and a coil spring disposed between an end portion of the slider of the slider mechanism and the other of the bottom corner of the finger switch, the turn table has an inner groove formed in parallel to the center line and inserted the inner boss and the outer boss, am outer groove formed outside of the inner groove in parallel thereto and inserted the outer boss, a first projection provided outside of the outer groove and moving the finger switch inner side of the turn table than the inner groove, and a second projection provided inside of the inner groove and moving the finger switch outer side of the turn table than the inner groove the finger, the finger switch, the coil spring, the inner groove, the outer groove, the first projection and the second projection are provided symmetrically about the center line.

On the other hand, the turn table may be driven to rotate in a condition where the finger mechanism is retracted within a rotating path of the turn table.

The driving motor may drive the slider to move and the fiber for opening and closing.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of a picker mechanism in a magnetic tape library apparatus according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1A:
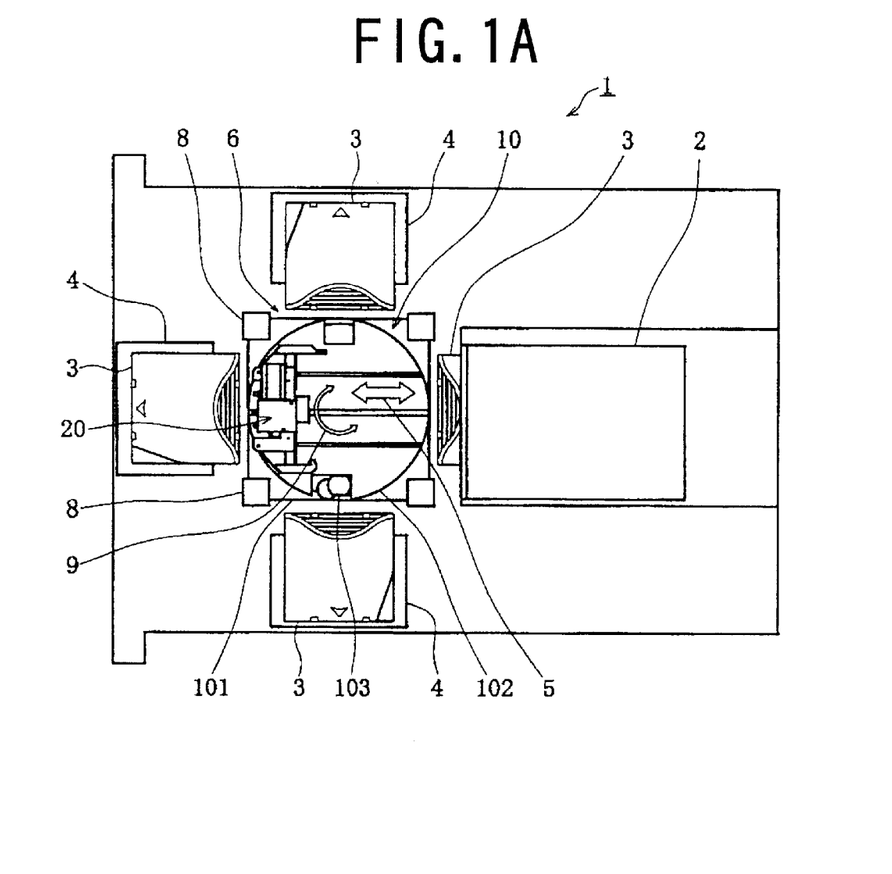
FIGS. 1A and 1B are respectively plan view and a front elevation showing one embodiment of a magnetic tape drive apparatus, in which a picker mechanism according to the present invention is installed.
Figure 1B:
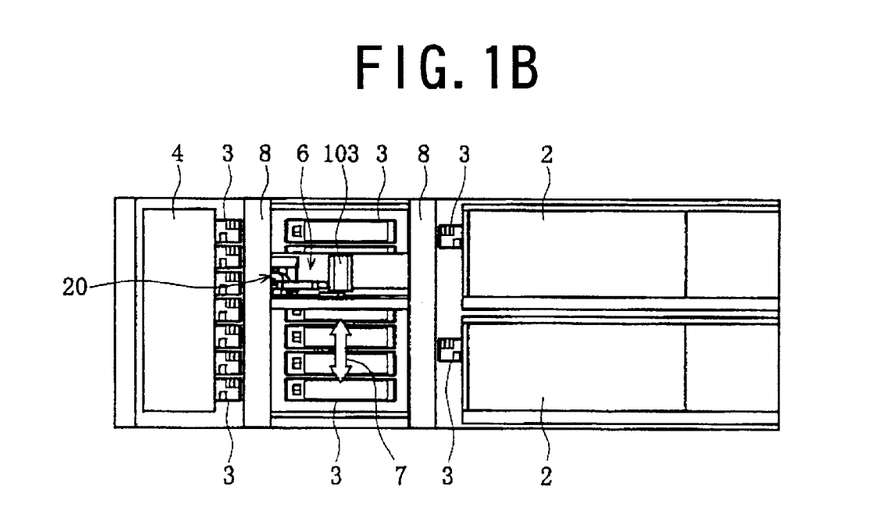
Figure 2:
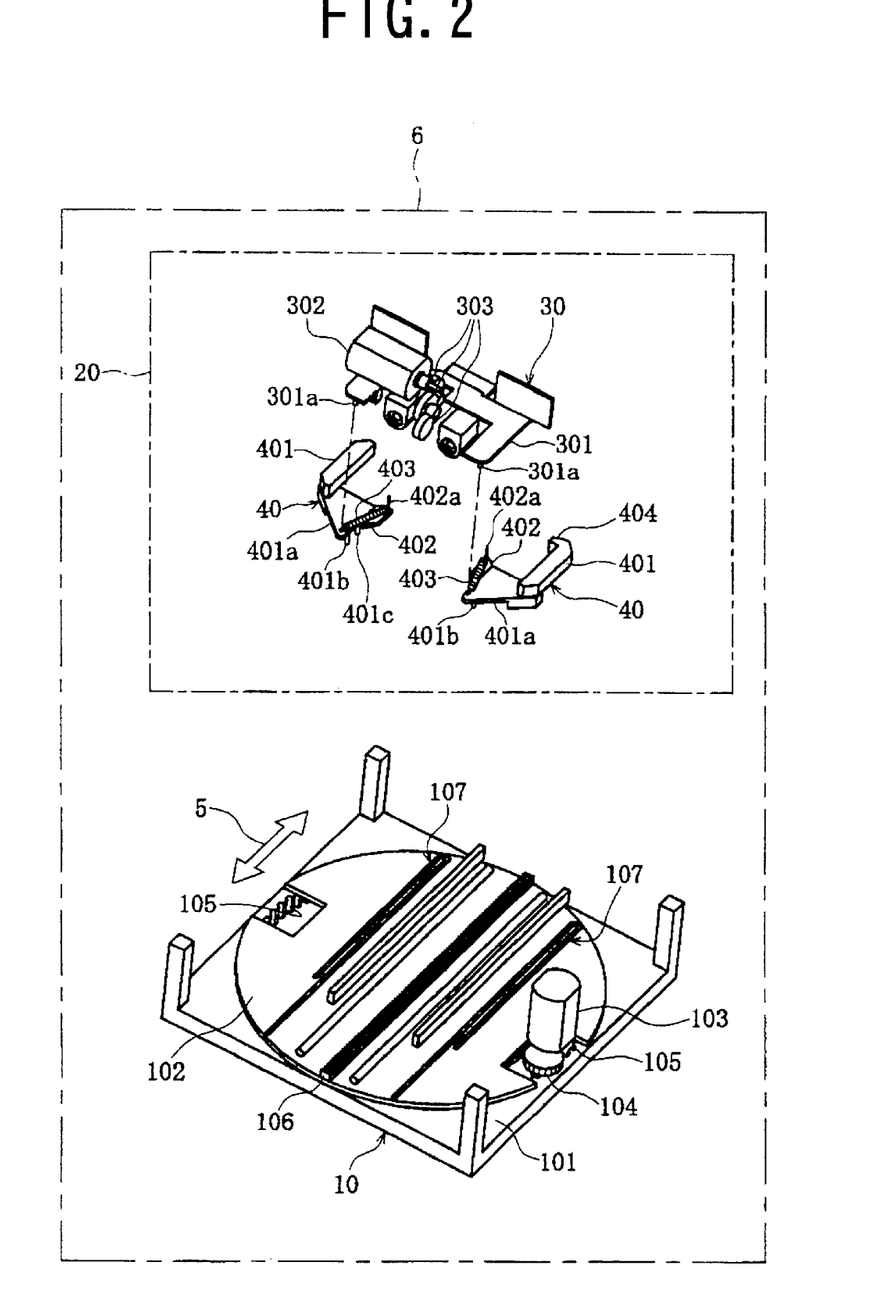
FIG. 2 is an exploded perspective view showing a construction of the picker mechanism according to the present invention.
Figure 3:
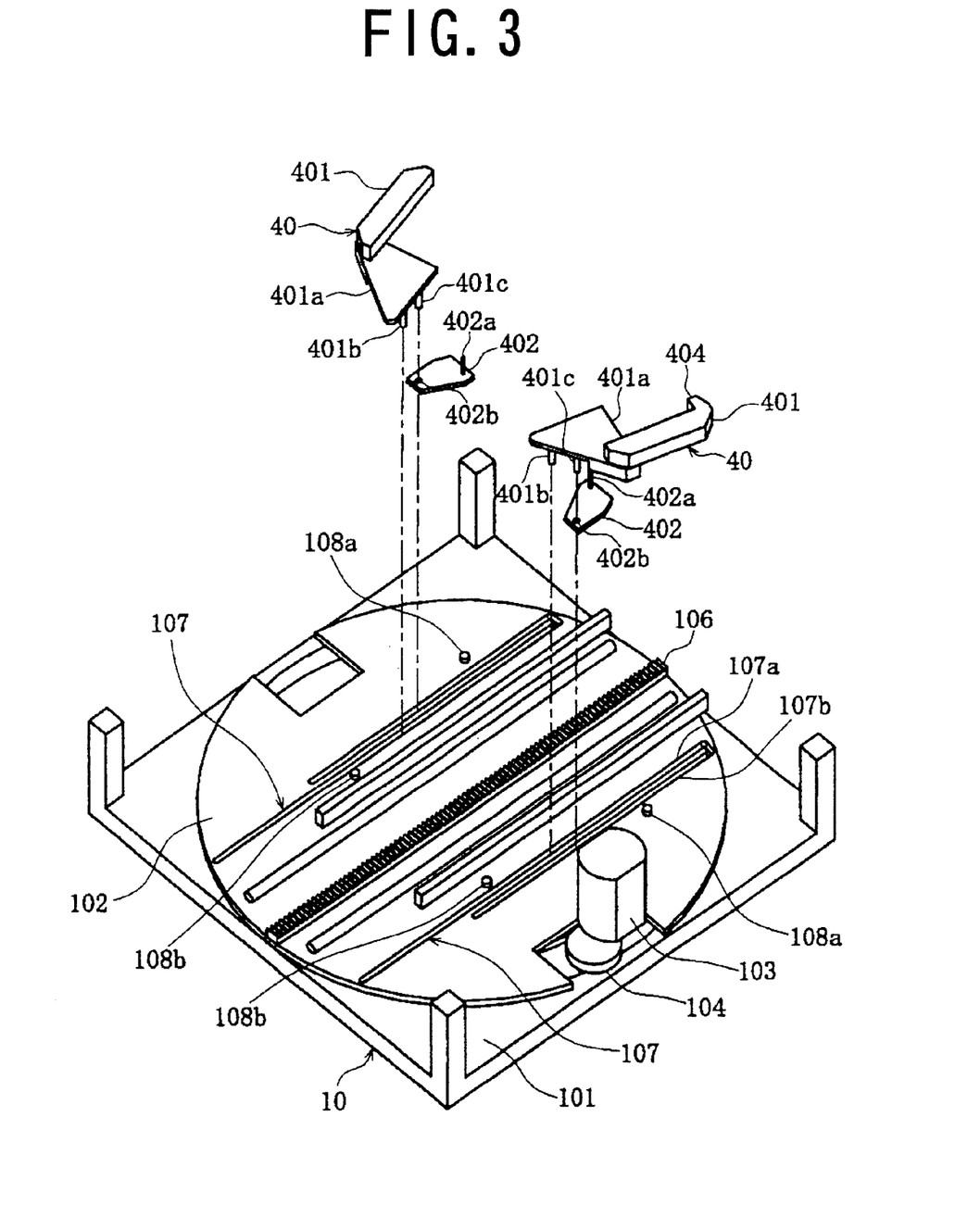
FIG. 3 is an exploded perspective view showing the picker mechanism according to the present invention showing a manner of assembling.
Figure 4A:
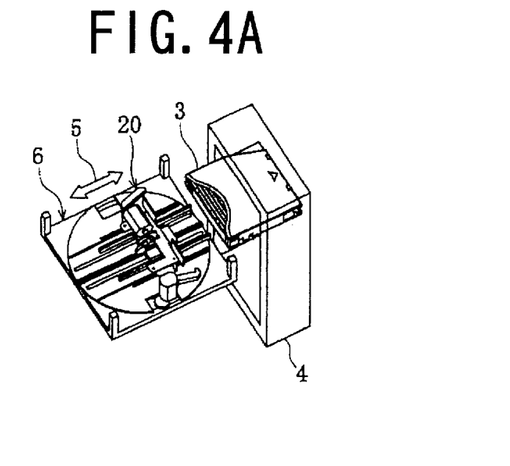
FIGS. 4A to 4E are explanatory perspective view showing operation of the picker mechanism according to the present invention.
Figure 4B:
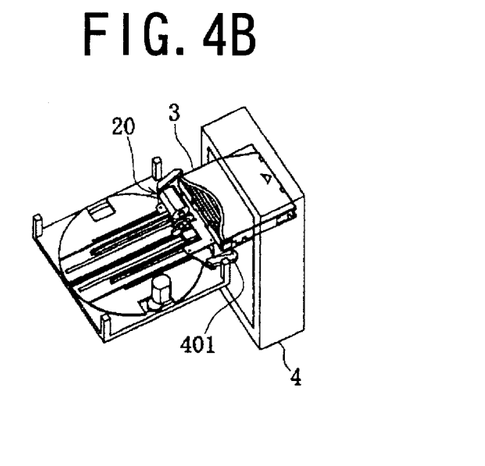
Figure 4C:
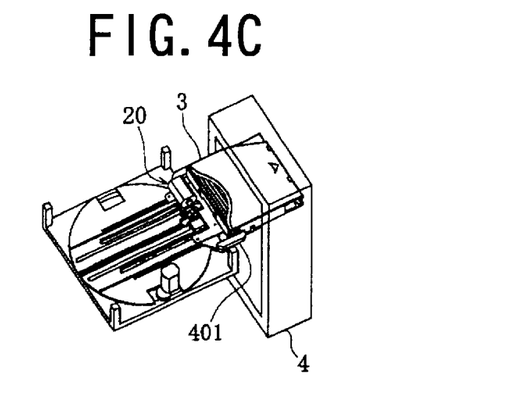
Figure 4D:
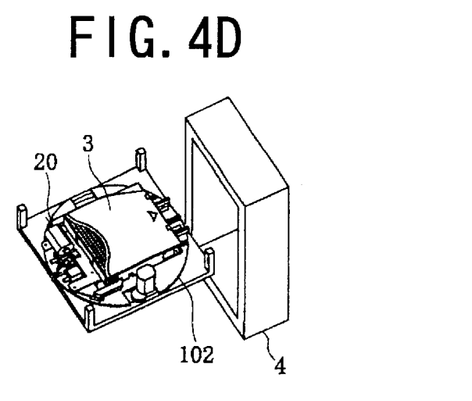
Figure 4E:
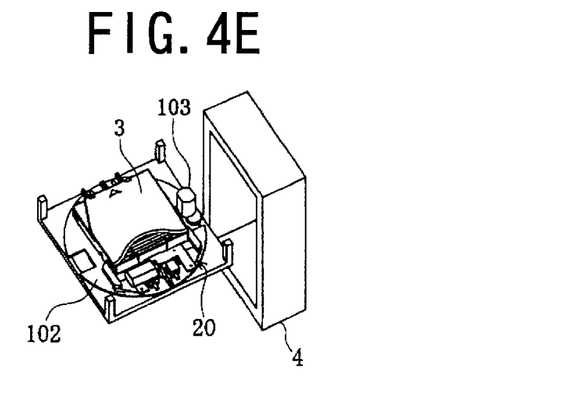
Figure 5:
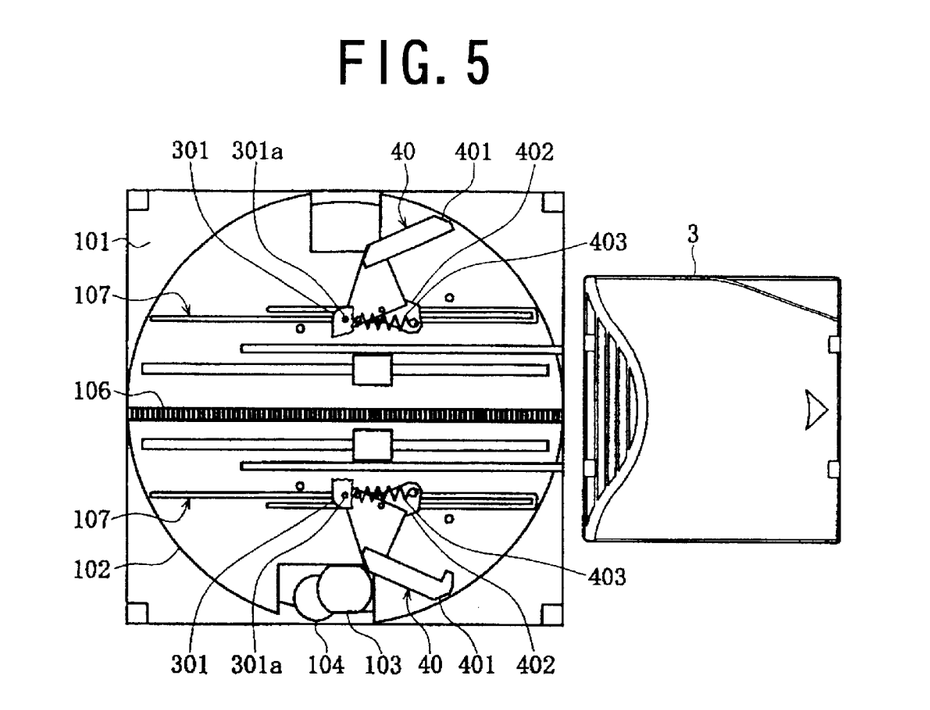
FIG. 5 is a plan view of a finger mechanism of the picker mechanism according to the present invention showing the finger mechanism in home position.
Figure 6:
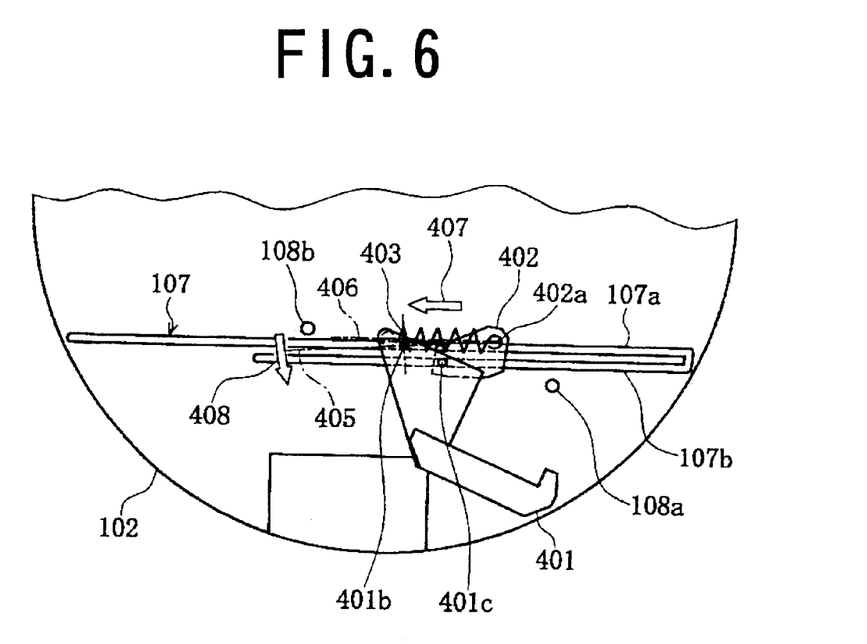
FIG. 6 is an explanatory partial plan view showing operation of the fiber mechanism of the picker mechanism according to the present invention in the home position of the finger mechanism.
Figure 7:
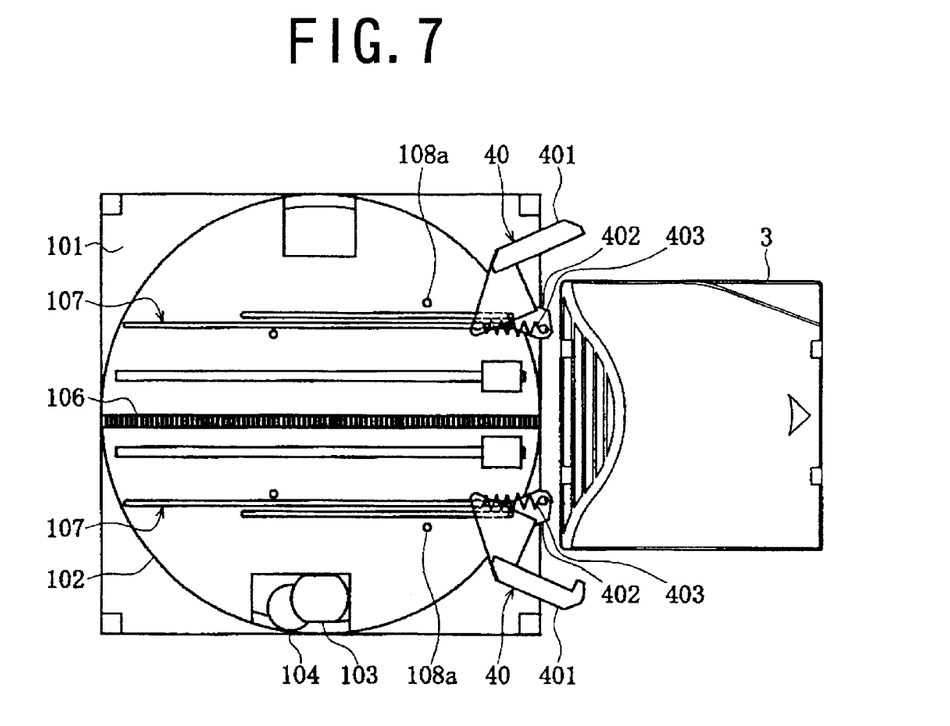
FIG. 7 is a plan view showing operation of the finger mechanism of the picker mechanism according to the present invention.
Figure 8:
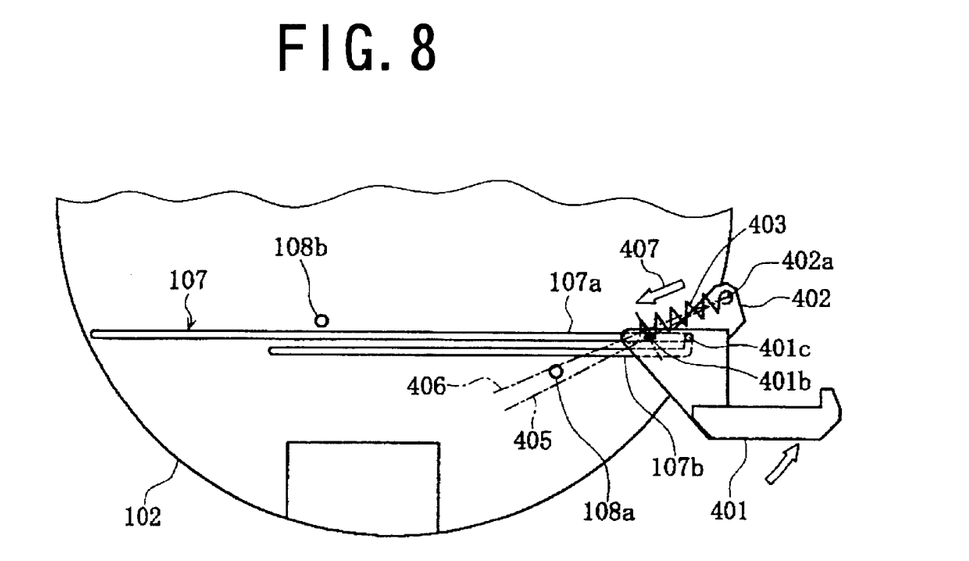
FIG. 8 is an explanatory partial plan view showing clamping operation of the finger mechanism of the picker mechanism according to the present invention.
Figure 9:
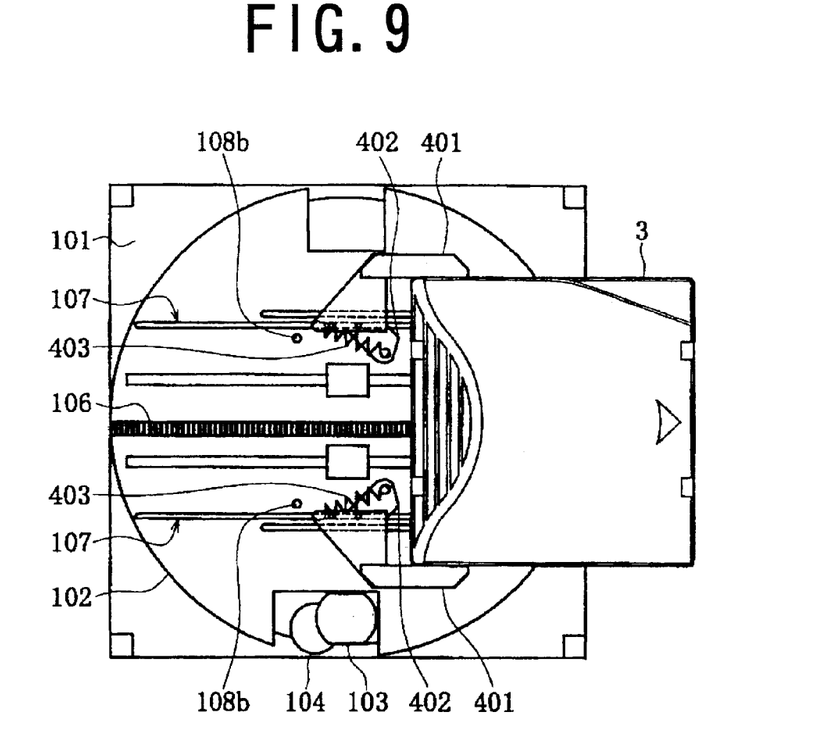
FIG. 9 is a plan view of the finger mechanism of the picker mechanism according to the present invention showing the finger mechanism in moving condition.
Figure 10:
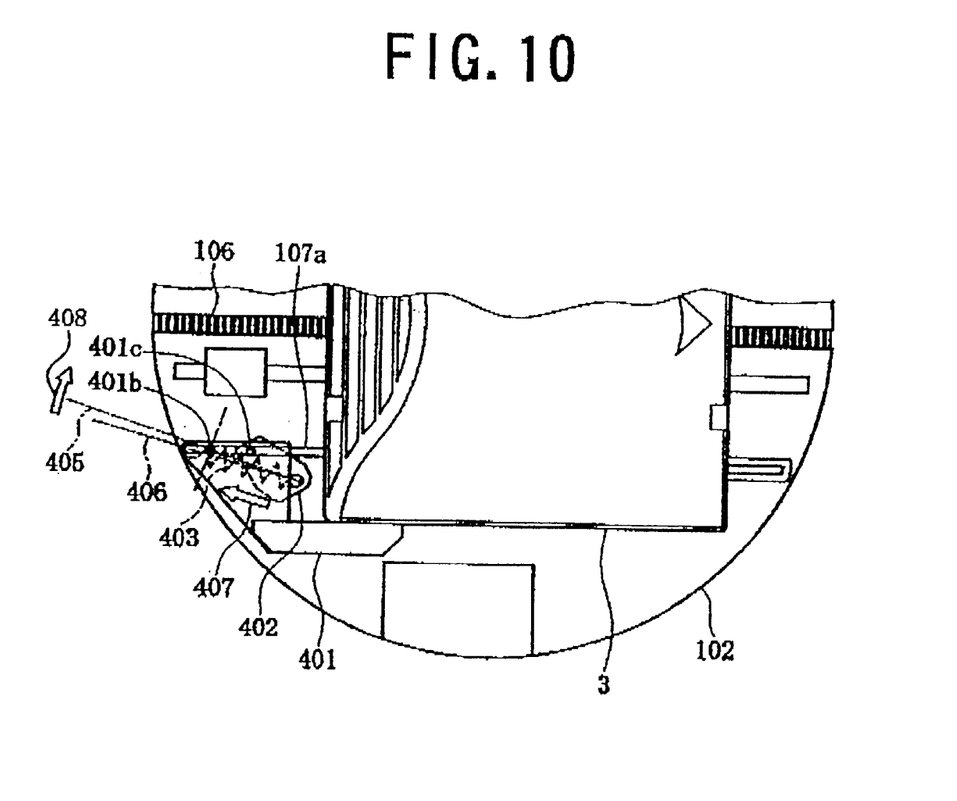
FIG. 10 is an enlarged partial plan view of the finger mechanism of the picker mechanism according to the present invention showing the finger mechanism in opening condition.
Figure 11:
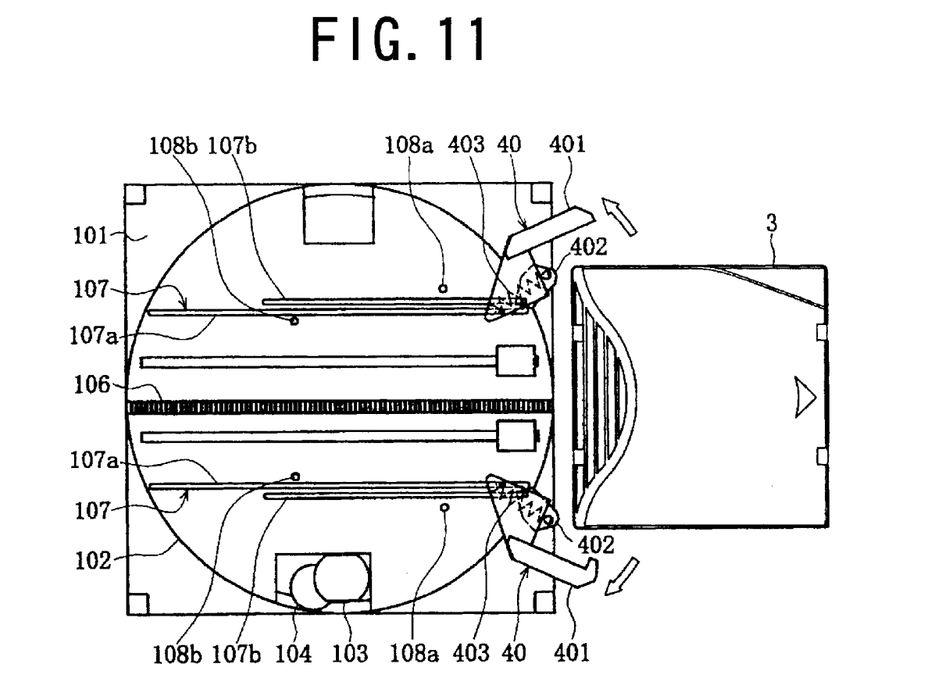
FIG. 11 is a plan view of the finger mechanism of the picker mechanism according to the present invention showing the finger mechanism in opening condition.
Figure 12:
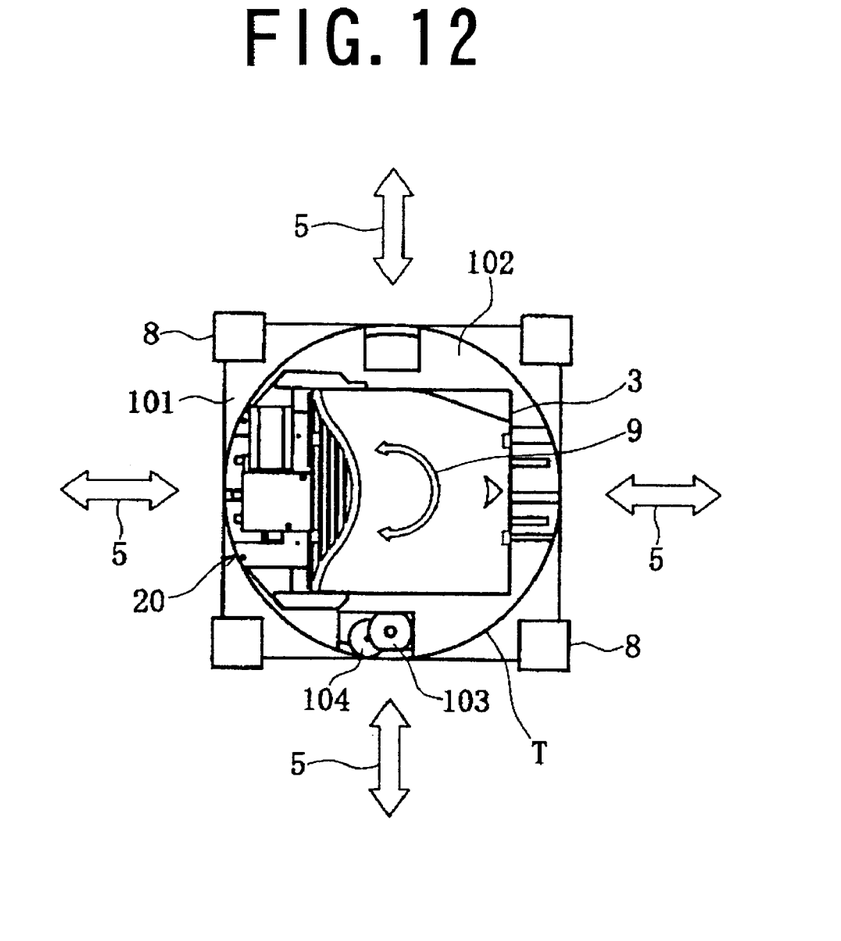
FIG. 12 is an explanatory plan view for explaining operation of the picker mechanism according to the present invention.
Figure 13A:
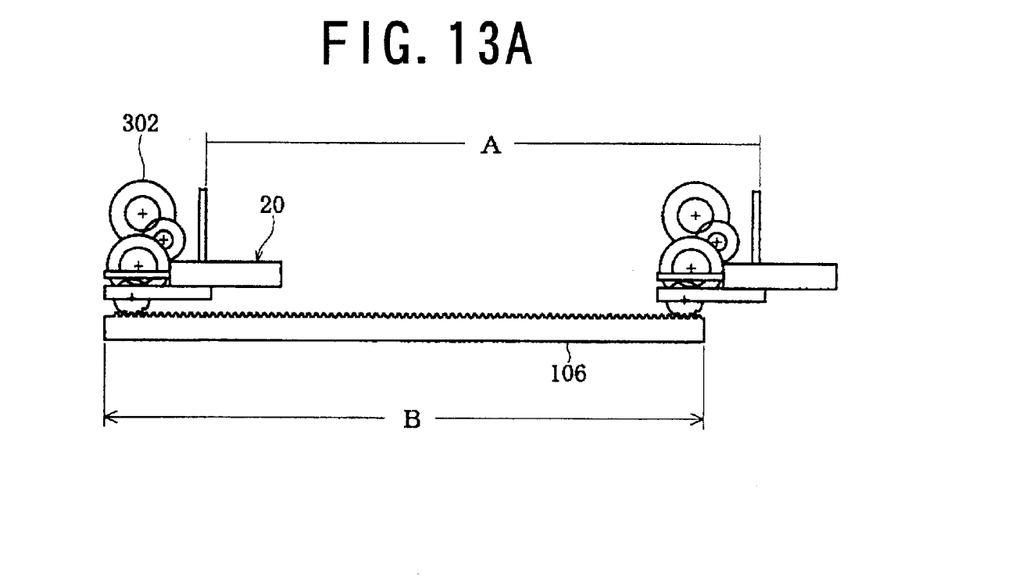
FIGS. 13A and 13B are explanatory side elevation for explaining constructional effect of the picker mechanism according to the present invention.
Figure 13B:
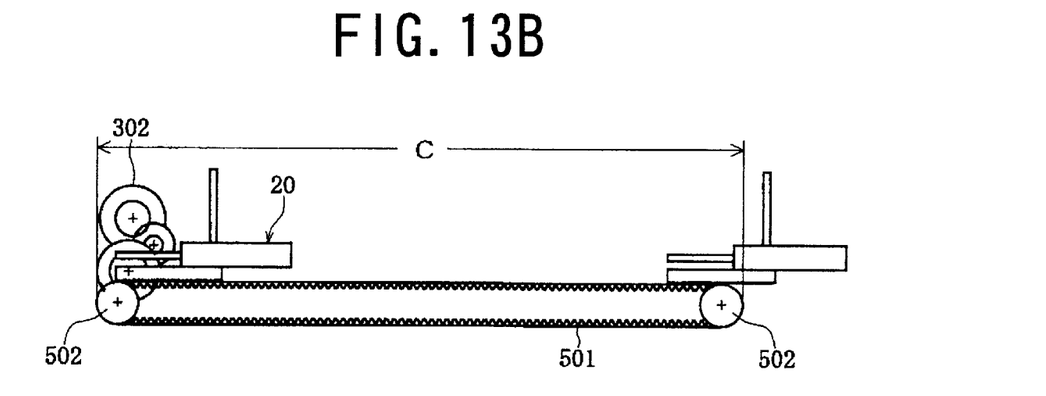

FIGS. 1A and 1B are respectively plan view and a front elevation showing one embodiment of a magnetic tape drive apparatus, in which a picker mechanism according to the present invention is installed, FIG. 2 is an exploded perspective view showing a construction of the picker mechanism according to the present invention, FIG. 3 is an exploded perspective view showing the picker mechanism according to the present invention showing a manner of assembling, FIGS. 4A to 4E are explanatory perspective view showing operation of the picker mechanism according to the present invention, FIG. 5 is a plan view of a finger mechanism of the picker mechanism according to the present invention showing the finger mechanism in home position, FIG. 6 is an explanatory partial plan view showing operation of the fiber mechanism of the picker mechanism according to the present invention in the home position of the finger mechanism, FIG. 7 is a plan view showing operation of the finger mechanism of the picker mechanism according to the present invention, FIG. 8 is an explanatory partial plan view showing clamping operation of the finger mechanism of the picker mechanism according to the present invention, FIG. 9 is a plan view of the finger mechanism of the picker mechanism according to the present invention showing the finger mechanism in moving condition, FIG. 10 is an enlarged partial plan view of the finger mechanism of the picker mechanism according to the present invention showing the finger mechanism in opening condition, FIG. 11 is a plan view of the finger mechanism of the picker mechanism according to the present invention showing the finger mechanism in opening condition, FIG. 12 is an explanatory plan view for explaining operation of the picker mechanism according to the present invention, and FIGS. 13A and 13B are explanatory side elevation for explaining constructional effect of the picker mechanism according to the present invention.

As shown in FIGS. 1A and 1B, a magnetic tape library apparatus 1 illustrating the preferred embodiment of the present invention is constructed with a magnetic tape drive reading and writing data from and on a magnetic tape housed within a magnetic tape cartridge 3, three magazine 4 for multi-stage storage of a plurality of magnetic tape cartridges 3 respectively, a picker mechanism for loading and unloading the magnetic tape cartridge to and from the magazine 4 and the magnetic tape drive 2 in back and forth direction (direction of arrow 5), and a lifter mechanism 8 transporting the magnetic tape cartridge 3 unloaded from the magazine 4 and the magnetic tape drive 2 by the picker mechanism 6 together with the picker mechanism 6 in up and down direction (direction of arrow 7). As shown in FIG. 1A, in plan view, around the picker mechanism 6, the magnetic tape drive 2 is positioned on right side of the picker mechanism 6 and magazines 4 are positioned on upper and lower side and left side of the picker mechanism 6. Therefore, directions for loading and unloading the magnetic tape cartridge 3 are four directions (direction of arrow 5 in FIG. 12). In the magnetic tape drive 2 and the magazine 4, loading and unloading directions of the magnetic tape cartridge 3 is differentiated respectively. The picker mechanism 6 is a mechanism for changing direction in pivoting direction (direction of arrow 9) of the magnetic tape cartridge 3. On the other hand, the picker mechanism 6 is mounted on lifter mechanisms 8 at four corners so that the picker mechanism 6 is wholly movable in vertical direction (direction of arrow 7).

As shown in FIG. 2, the construction of the picker mechanism 6 is constructed with a Swivel operation mechanism 10 changing direction of the magnetic tape cartridge 3 and a hand mechanism 20 clamping the magnetic tape cartridge 3 for loading and unloading.

As shown in FIGS. 2 and 3, the Swivel operation mechanism 10 is constructed with a picker base 101 mounted on the lifter mechanisms 8 and a turn table 102 mounted for rotation on the picker base 101. The picker base 101 is substantially square plate member. On the lower surface, an arc shaped groove is formed at the center of the square. On the outer peripheral edge of the groove, a teeth portion is formed as an internal gear 105.

The turn table 102 is a disc. On the turn table 102, a turn table driving motor 103 for reversibly driving the turn table 102 with downwardly directing a rotary shape thereof. On the rotary shaft of the turn table driving motor 103, a gear 104 as an external gear for amplifying rotational torque to the motor 103, is mounted. It should be noted that the turn table driving motor 103 is provided so as not to project outside of the outer periphery of the turn table 102. The turn table 102 is rotatably provided on the picker base 101 for rotation about the center of the picker base 101. On the other hand, the gear 104 is meshed with the internal gear 105. It should be noted that while the internal gear is provided on the turn table 102, it is not limited to the internal gear but can be external gear.

On the other hand, on the upper surface of the turn table 102, a rack 106 is provided along a center line dividing the upper surface of the turn table 102 into left and right half circles.

The hand mechanism 20 is constructed with a pair of finger mechanism 40 clamping the magnetic tape cartridge 3 and a slider mechanism 30 moving the finger mechanism 40 in back and forth on the turn table 102.

The slider mechanism 30 includes a slider 301 formed by bending a plate member into L-shaped configuration and sliding in back and forth direction on the turn table 102 and a driving motor for 302 arranged on the slider 301 and driving the slider 301 in back and forth direction. The bottom of the slider 301 is a rectangular plate form and is mounted perpendicular to the rack 106 which will be discussed later. On the other hand, between a rotary shaft of the driving motor 302 and the rack 106 of the turn table 102, a plurality of reduction gears 303 meshing with each other are provided. Amongst, one of the reduction gears 303 is rigidly secured on the rotary shaft of the driving motor 302, and another one is meshed with the teeth portion on the upper surface of the rack 106 as pinion.

Each finger mechanism 40 includes a finger 401 which is bar member arranged horizontally, a finger switch 402 which is substantially triangular plate member provided horizontally, and a coil spring 403. On the finger 401, a finger base 401a as substantially triangular plate, is mounted on one of bottom corners at one end. The finger base 401a has an inner boss 401b depending from other bottom corners of the back surface and an outer boss 401c provided in parallel to the inner boss 401b. On the other end of the finger 401 of the one finger mechanism 40, a claw 404 is provided. During opening and closing operation of a pair of finger mechanisms 40, the claw 404 penetrates into a recessed portion on the side surface of the magnetic tape cartridge 3. It should be noted that the inner boss 401b and the outer boss 401c may be directly provided at one end portion of finger 401 without using the finger base 401a.

In one of the bottom corners of the finger switch 402, a hole 402b is formed. In the other of the bottom corners, a boss 402a is provided upwardly. By engaging the hole 402b with the outer boss 401c, the finger switch 402 is tightly fitted in parallel to the fiber base 401a so that the finger switch 402 may pivot about the outer boss 401c. On the other hand, the finger base 401 and the finger switch 402 are arranged so that the boss 402a may extend upwardly from outside of the tightly fitted finger base 401a. Also, the finger base 401a is arranged between the slider 301 and the turn table 102. The coil spring 403 is located between the finger base 401a and the slider 301. One end of the coil spring 403 is connected to the boss 301a at the end portion of the slider 301 and the other end is connected to the boss 402a.

It should be noted that, associating with the finger mechanism 40, two guide grooves 107 are formed in parallel to the center line which divides the turn table 102 in to left and right halves. Each guide groove 107 is consisted of an inner groove 107a formed on the center line side and an outer groove 107b formed outside of the inner groove 107a in parallel thereto. The inner groove 107a and the outer groove 107b are connected at one end. A direction of the connected one ends of the inner groove 107a and the outer groove 107b is front side of the turn table 102, toward which the slider mechanism 30 is moved in forward direction. The direction is also directed to the magnetic tape cartridge 3 to be clamped.

On the upper surface of the turn table 102, an outer projection 108a is provided at outer side of the outer groove 107b and front side of the turn table 102 and an inner groove 107a is provided at inner side of the inner groove 107a and rear side of the turn table 102. As shown in FIGS. 5 and 6, when the hand mechanism 20 is in home position where the finger 401 is opened without clamping the magnetic tape cartridge 3, the inner boss 401b of the finger base 401a is inserted into the inner groove 107a and the outer boss 401c of the finger base 401a is inserted into the outer groove 107b.

Discussion will be given hereinafter concerning the picker mechanism 6 of the magnetic tape library apparatus 1 constructed as set forth above, and the operation with reference to FIGS. 1 to 13. At first, as shown in FIGS. 5 and 6, the hand mechanism 20 is placed at the home position in a condition where a pair of fingers 401 is held open without clamping the magnetic tape cartridge 3 (FIG. 4A). From this condition, the picker mechanism 6 starts operation.

Discussion will be given for the flow from taking out the magnetic tape cartridge 3 from the magazine 4 to insert the magnetic tape drive 2. At first, by Swivel operation mechanism 10, the front side of the turn table 102 is turned in the direction of the magazine 4, in which the desired magnetic tape cartridge 3 is housed, for changing direction. Particularly, the turn table driving motor 103 is driven to rotate the gear 104 to move along the internal gear 105 to obtain rotation force of the turn table 102 for changing direction. When the hand mechanism 20 is placed at this home position, the tip end of the finger 401 does not project from rotating path T of the turn table 102 and is retracted with in the rotating path T of the turn table 102 to make it possible to restrict area of the rotating path of the turn table to permit down-sizing of the picker mechanism 6.

As shown in FIG. 6, when the hand mechanism 20 is placed in the home position, the finger switch 402 is located inner side direction of the inner groove 107a. Therefore, the direction 406 of the tension force of the coil spring is directed toward inside of a line 405 extending through the boss 402a, to which the coil spring 403 of the finger switch 402 is connected and the rotation center of the finger (inner boss 401b) to generate a moment 408 in a direction closing the finger 401. However, in practice, the inner boss 401b is inserted into the inner groove 107a and the outer boss 401c is inserted into the outer groove 107b. Therefore, despite of presence of moment 408 the finger 401 is not actually rotated.

Next, when the finger mechanism 40 is moved to pick-up the magnetic tape cartridge 3, a pair of finger mechanism 40 is moved frontwardly as shown in FIG. 7 (FIG. 4B). By driving the driving motor 302 provided in the slider 301, the slider 301 is moved forward direction. Then, according to forward movement of the slider 301, a pair of finger mechanism 40 connected to the slider is also moved forward direction.

However, by the guide groove 107, a pair of fingers 401 are moved forward with maintaining open condition. When a pair of finger mechanism 40 is placed at the most forward position, a pair of fingers 401 biased in closing direction by a tension force 407 of the coil spring as shown in FIG. 8, is closed along the guide groove 107 and whereby clamp the magnetic tape cartridge (FIG. 4C). Namely, by moving the outer boss 401c from the outer groove 107b to the inner groove 107a, a pair of finger 401 is closed.

Next, the finger mechanism 40 is moved backward to retract the magnetic tape cartridge 3 directly above the turn table 102 as shown in FIG. 9. On the way of retraction of the magnetic tape cartridge 3, orientation of the finger switch 402 is turned toward outside of the inner groove 107a by the inner projection 108b on the turn table 102. Then, direction 406 of the tension force 407 of the coil springs 403 of a pair of finger mechanisms 40 is directed outside of the line 405 extending through the boss 402a, to which the coil spring 403 of the finger switch 402 is connected and the rotation center of the finger (inner boss 401b) to generate the moment 408 to bias a pair of fingers 401 in opening direction. However, by the effect of the guide grooves 107, a pair of fingers 401 are moved backward with maintaining closed position. Thus, the magnetic tape cartridge 3 can be taken out from the magazine 4 completely (FIG. 4D).

Then, the Swivel operation mechanism is operated to rotate the turn table 102 together with the magnetic tape cartridge 3 (rotating direction 9) to direct the hand mechanism 20 and the magnetic tape cartridge 3 toward the magnetic tape drive 2 (FIG. 4E).

Upon ejecting the loaded magnetic tape cartridge 3, a pair of the finger mechanisms 40 are moved forward to push out the magnetic tape cartridge 3 by the slider 301. While a pair of fingers 401 are biased in opening direction, the fingers 401 are held closed position to move forward with maintaining clamping of the magnetic tape cartridge 3. When a pair of finger mechanisms 40 are placed at the most forward position, a pair of fingers 401 are opened along the guide grooves 107 to release the magnetic tape cartridge 3 as shown in FIG. 11. Namely, by moving the outer boss 401c from the outer groove 107c to the outer groove 107b, a pair of fibers 401 is opened.

Next, a pair of finger mechanisms 40 are moved backward to the home position shown in FIG. 5. On the way of backward movement, orientation of the finger switch 402 is turned toward inner side of the inner groove 107a by the outer projection 108b on the turn table 102. Then, as shown in FIG. 6, direction 406 of the tension force 407 of the coil springs 403 of a pair of finger mechanisms 30 is directed inside of a line 405 extending through the boss 402a, to which the coil spring 403 of the finger switch 402 is connected and the rotation center of the finger (inner boss 401b) to generate a moment 408 in a direction closing the finger 401. However, a pair of fingers 401 are moved backward with maintaining open condition by the guide groove 107 to return to the home position.

With the picker mechanism 6 of the magnetic tape library apparatus 1 in the shown embodiment, since the turn table driving motor 103 for driving the turn table 102 is provided on the turn table 102, to make it possible to restrict area of the rotating path of the turn table to permit down-sizing of the picker mechanism 6.

On the other hand, since the turn table driving motor 103 is arranged on the upper surface of the turn table 102 and outside of the path (rotating path T) of the hand mechanism 40 and the magnetic tape cartridge 3, size of the picker mechanism in vertical direction can be restricted to be small in comparison with the case where the turn table driving motor 103 is arranged below the picker base 101.

Also, since the center of rotation of the turn table 102 is located at the center of the picker base 101, a region above the picker base 101 can be used as the rotating path without wasting the space to restrict the size of the picker base 101.

Furthermore, since the picker base 101 is square and a length of one edge of the picker base 101 is substantially equal to a diameter of the turn table 102, a region above the picker base 101 can be used as the rotating path without wasting the space to restrict the size of the picker base 101.

On the other hand, with the shown embodiment, a construction is taken to drive the hand mechanism 20 consisted of the slider mechanism 30 and a pair of finger mechanism 40 by the rack 106 and the gear 303 serving as pinion, to place the driving motor 302 on the slider mechanism 30 to be moved in back and forth direction. Therefore, back and forth length of the picker mechanism can be restricted to be small with maintaining the back and forth stroke of the hand mechanism. As shown in FIGS. 13A and 13B, when the motion distance A of the hand mechanism 20 is held constant, a length B (diameter of the turn table 102) of the rack in case of the structure for driving the hand mechanism 20 of the shown embodiment by the rack 106 and the gear 303 as the pinion as shown in FIG. 13A, can be shorter in comparison with the distance of the pulleys in the case where the hand mechanism 20 is moved by mounting on the belt 501 extended between two pulleys 502 spaced a distance C from each other.

A structure for operating a pair of finger mechanisms 40 for opening and closing in cooperation with back and forth operation of the slider mechanism 30 can be simple. It becomes unnecessary to provide special driving means for opening and closing the finger 401 to contribute for down-sizing of the picker mechanism 6.

Also, since one driving motor 302 is used for driving the slider 301 and for opening and closing a pair of fingers 401, drive system can be simplified to permit down-sizing of the picker mechanism 6.

With the construction set forth above, since the turn table driving motor for driving the turn table is provided in the turn table, space of the portion other than the turn table can be restricted to be small to permit down-sizing of the picker mechanism.

Also, since the turn table driving motor is arranged on the upper surface of the turn table and outside of the path of the hand mechanism and the magnetic tape cartridge, size of the picker mechanism in vertical direction can be restricted to be small in comparison with the case where the turn table driving motor is arranged below the picker base.

Since the center of rotation of the turn table is located at the center of the picker base, a region above the picker base can be used as the rotating path without wasting the space to restrict the size of the picker base.

Since the picker base is square and a length of one edge of the picker base is substantially equal to a diameter of the turn table, a region above the picker base can be used as the rotating path without wasting the space to restrict the size of the picker base.

A construction is taken to drive the hand mechanism consisted of the slider mechanism and a pair of finger mechanism by the rack and the pinion, to place the driving motor on the slider mechanism to be moved in back and forth direction. Therefore, back and forth length of the picker mechanism can be restricted to be small with maintaining the back and forth stroke of the hand mechanism.

Since one driving motor is used for driving the slider and for opening and closing a pair of fingers, drive system can be simplified to permit down-sizing of the picker mechanism.

Since the finger is received within rotating path of the turn table when the turn table is rotated, area of the rotating path of the turn table can be restricted to be small to permit down-sizing of the picker mechanism.

Also, since one driving motor is used for driving the slider and for opening and closing a pair of fingers, drive system can be simplified to permit down-sizing of the picker mechanism.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A picker mechanism of a magnetic tape library apparatus including a magnetic tape drive for reading and writing a magnetic tape housed within a magnetic tape cartridge and a magazine storing a plurality of said magnetic tape cartridges, for loading and unloading said magnetic tape cartridge to and from said magnetic tape drive and said magazine, comprising:

a Swivel mechanism having a disc shaped turn table, a turn table driving motor for driving said turn table and a plate form picker base holding said turn table; and a hand mechanism having a finger mechanism for clamping said magnetic tape cartridge and a slider mechanism for moving said magnetic tape cartridge on said turn table, said turn table driving motor being arranged on said turn table and said turn table driving motor and said turn table are integrally rotated on said picker base.

2. A picker mechanism of a magnetic tape library apparatus as set forth in claim 1, wherein said turn table driving motor is arranged on the upper surface of said turn table and outside of said hand mechanism and said magnetic tape cartridge.

3. A picker mechanism of a magnetic tape library apparatus as set forth in claim 1, wherein a center of rotation of said turn table is located at the position of a center of said picker base.

4. A picker mechanism of a magnetic tape library apparatus as set forth in claim 1, wherein said picker base is square and a diameter of said turn table and one edge of said picker base are substantially equal to each other.

5. A picker mechanism of a magnetic tape library apparatus as set forth in claim 1, wherein said slider mechanism includes a rack provided long a center line dividing said turn table into left and right half-circular halves, a pinion engaging with said rack, a driving motor for driving said pinion and a plate form slider, on which said driving motor of said slider mechanism is secured, said slider is moved along said rack via said pinion, and said finger mechanism provided on said slider is moved in back and forth direction on said turn table.

6. A picker mechanism of a magnetic tape library apparatus as set forth in claim 5, wherein said finger mechanism includes a finger being a bar member arranged horizontally, having an inner boss provided depending in the vicinity of one end portion of said finger and an outer boss provided in parallel to said inner boss, a finger switch formed from a substantially triangular plate member and pivotably supported on said outer boss at one bottom corner, and a coil spring disposed between an end portion of said slider of said slider mechanism and the other of the bottom corner of said finger switch, said turn table has an inner groove formed in parallel to said center line and inserted said inner boss and said outer boss, an outer groove formed outside of said inner groove in parallel thereto and inserted said outer boss, a first projection provided outside of said outer groove and moving said finger switch on an inner side of said turn table than said inner groove, and a second projection provided inside of said inner groove and moving said finger switch on an outer side of said turn table than said inner groove, said finger, said finger switch, said coil spring, said inner groove, said outer groove, said first projection and said second projection are provided symmetrically about said center line.

7. A picker mechanism of a magnetic tape library apparatus as set forth in claim 1, wherein said turn table is driven to rotate in a condition where said finger mechanism is retracted within a rotating path of said turn table.

8. A picker mechanism of a magnetic tape library apparatus as set forth in claim 6, wherein said driving motor of said slider mechanism drives said slider to move and said finger for opening and closing.

* * * * *

UNITED STATES PATENT AND TRADEMARK OFFICE
CERTIFICATE OF CORRECTION

PATENT NO. : 6,839,198 B2
DATED : January 4, 2005
INVENTOR(S) : Hiroyuki Shimanuki It is certified that error appears in the above-identified patent and that said Letters Patent is hereby corrected as shown below:

Column 9,
Line 40, delete "said"

Signed and Sealed this

Third Day of May, 2005

JON W. DUDAS
*Director of the United States Patent and Trademark Office*